United States Patent [19]

Kromer et al.

[11] Patent Number: 4,583,236
[45] Date of Patent: Apr. 15, 1986

[54] MODIFIED ABSOLUTE PHASE DETECTOR

[75] Inventors: Philip F. Kromer, Chevy Chase, Md.; Rangarajan Srinivasagopalan; Raul F. Fernandez, both of Miami, Fla.

[73] Assignee: Racal Data Communications Inc., Miami, Fla.

[21] Appl. No.: 698,466

[22] Filed: Feb. 5, 1985

Related U.S. Application Data

[63] Continuation-in-part of Ser. No. 548,572, Nov. 4, 1983.

[51] Int. Cl.[4] .......................... H04L 1/00; H04L 7/00
[52] U.S. Cl. ........................................ 375/17; 375/39; 375/118; 375/20; 371/43; 371/46; 371/49
[58] Field of Search ................. 375/17, 20:39, 42, 53, 375/54, 56, 57, 83, 86, 111, 118; 371/43, 44, 45, 46, 49; 332/9 R, 10; 329/50, 122

[56] References Cited

U.S. PATENT DOCUMENTS

| | | | |
|---|---|---|---|
| 3,744,023 | 7/1973 | Carpentier et al. | 371/49 |
| 3,806,647 | 4/1974 | Dohne et al. | 375/51 |
| 3,988,540 | 10/1976 | Scott et al. | 375/53 |
| 4,035,767 | 7/1977 | Chen et al. | 371/43 |
| 4,052,557 | 10/1977 | Chiu et al. | 375/83 |
| 4,077,021 | 2/1978 | Csajka et al. | 332/9 R |
| 4,084,137 | 4/1978 | Welti | 375/42 |
| 4,130,818 | 12/1978 | Snyder, Jr. | 371/43 |
| 4,227,152 | 10/1980 | Godard et al. | 333/18 |
| 4,334,312 | 6/1982 | Yoshida | 329/122 |
| 4,347,616 | 8/1982 | Murakami | 375/20 |
| 4,483,012 | 11/1984 | Wei | 371/43 |
| 4,486,882 | 12/1984 | Piret et al. | 371/45 |
| 4,494,239 | 1/1985 | Martin | 370/20 |

OTHER PUBLICATIONS

Kobayashi, Yanagidaira and Kawai, "An Application of Soft Decision to Error Correcting Codes", IEEE Trans., vol. 1 of 3, pp. 293–298, Jun. 19–22, 1983.
"Channel Coding with Multilevel/Phase Signals", G. Ungerboeck, IEEE Transactions of Information Theory, Jan. 1982, pp, 55–66.
"A Trellis–Coded Modulation Scheme that Includes Differential Encoding for 9600 Bit/sec, Full–Duplex, Two-wire Modem", Int. Telegraph and Telephone Consultative Committee (CCITT), Aug. 1983.

Primary Examiner—Benedict V. Safourek
Attorney, Agent, or Firm—William A. Newton

[57] ABSTRACT

Disclosed is a modulation-demodulation system and method for transmitting a plurality of sequentially received information bit sequences, the system including a transmitter having a state machine for expanding by a coding process each information bit sequence into an expanded bit sequence with a coded bit group portion and, in some cases, an uncoded bit group portion. The transmitter further includes a modulator for modulating a carrier signal by one of a plurality of multilevel symbols in a two-dimensional complex plane in response to each sequentially applied expanded bit sequence, with the coded bit group portion being used to specify a subset of the multilevel symbols which when rotated in the complex plane maps upon another subset for each adverse angular rotation and the uncoded bit group portion being used to specify for a selected multiple symbol subset the transmitted multilevel symbol of the carrier signal. The system further includes a receiver having a demodulator and slicer for demodulating and detecting the modulated carrier signal to obtain the expanded bit sequences; a phase rotation detector, coupled to the slicer, for uniquely identifying each adverse angular rotation by analyzing a plurality of non-rotated and rotated sequentially received coded bit group portions; and a phase corrector, coupled to the phase rotation detector, for compensating for the adverse angular rotation.

17 Claims, 10 Drawing Figures

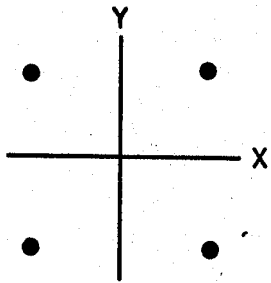
FIG_1_
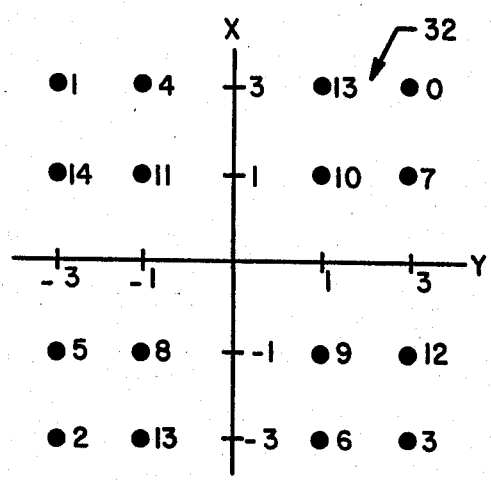
FIG_4_
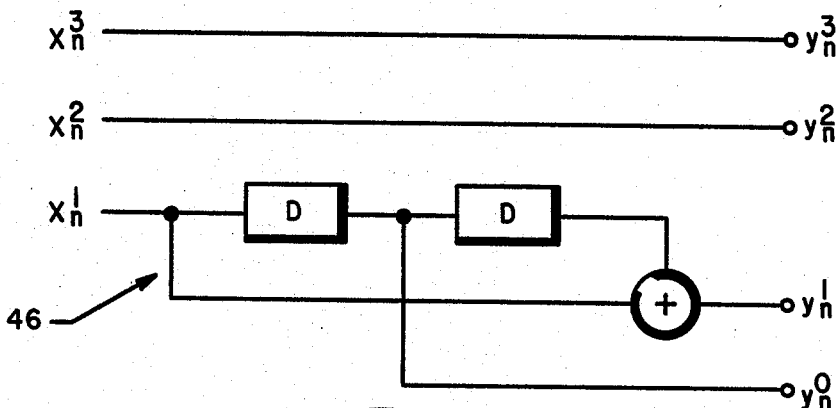
FIG_5_
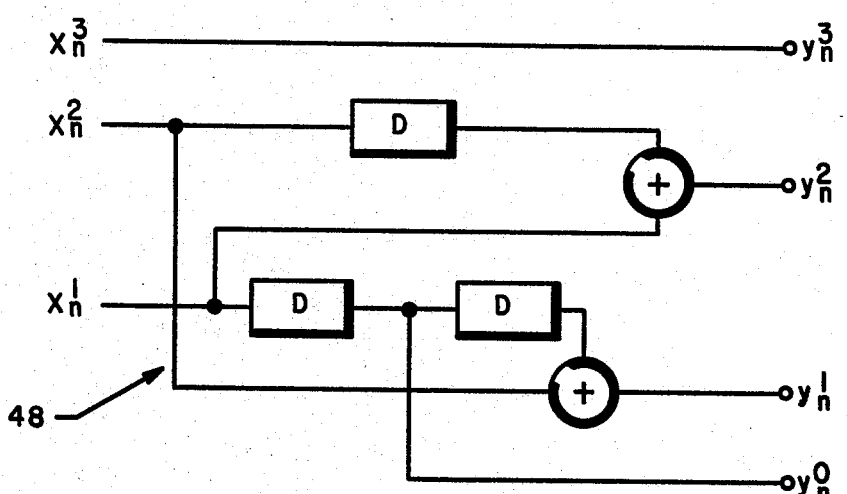
FIG_6_

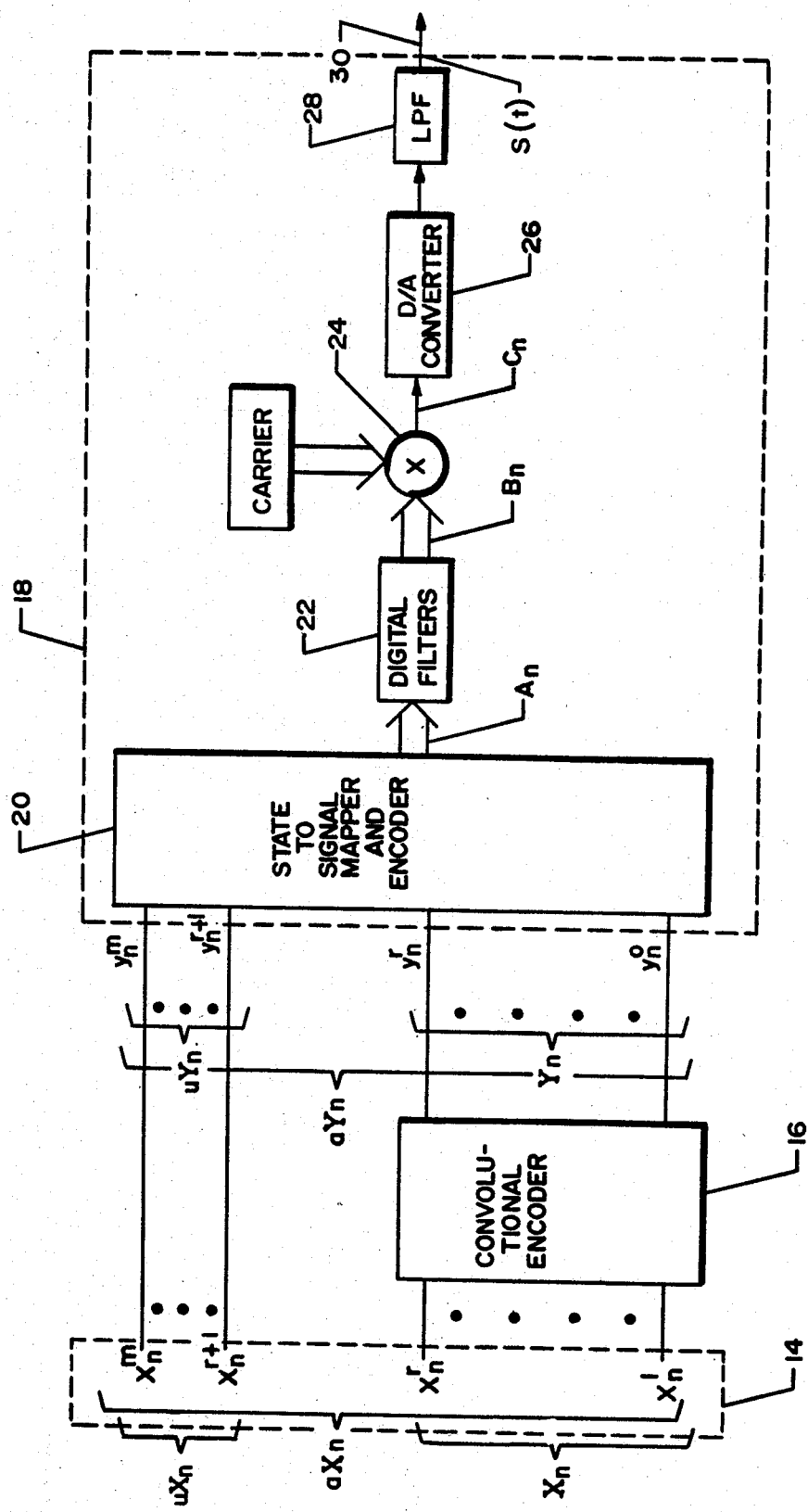
FIG_2

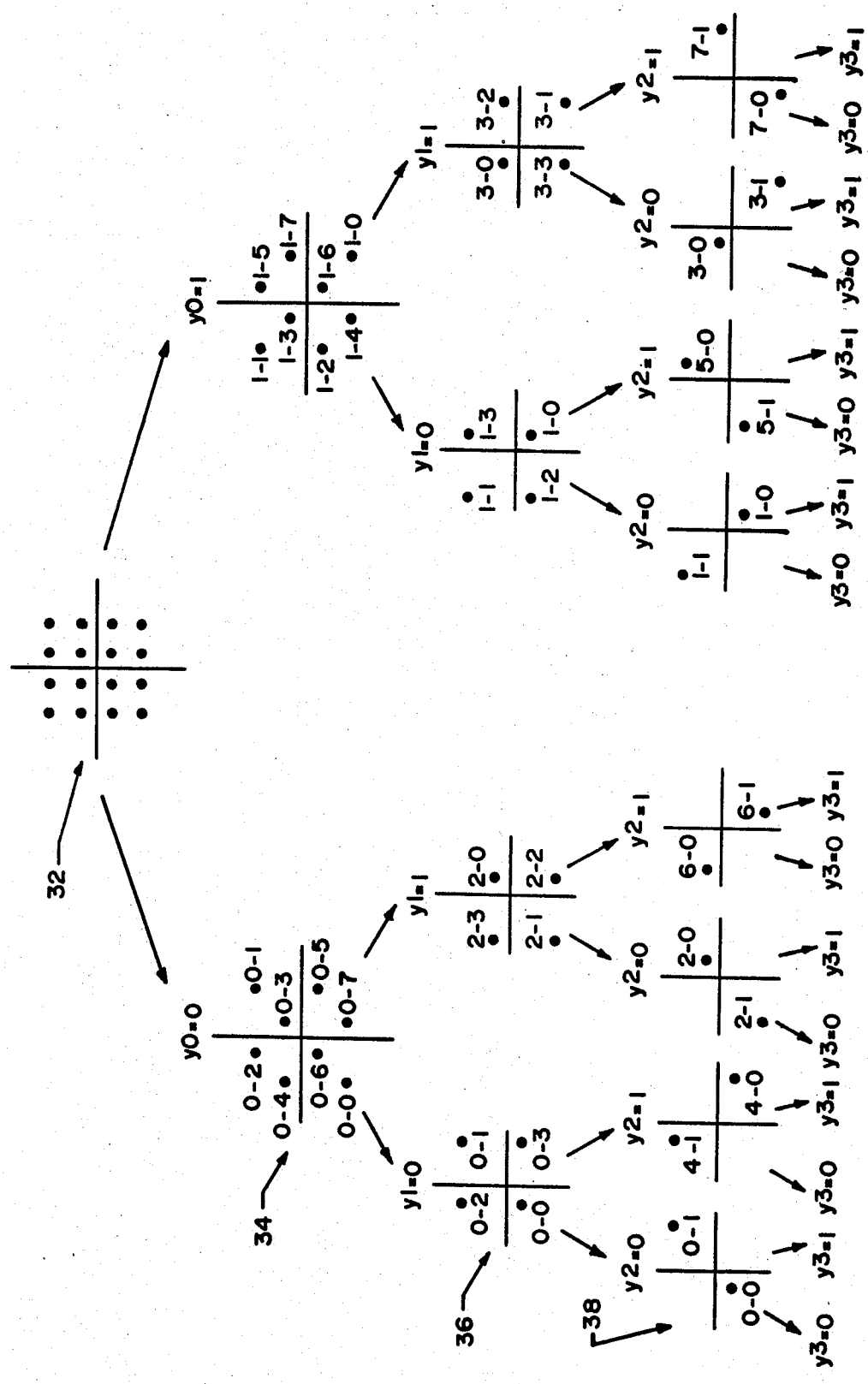
FIG_3

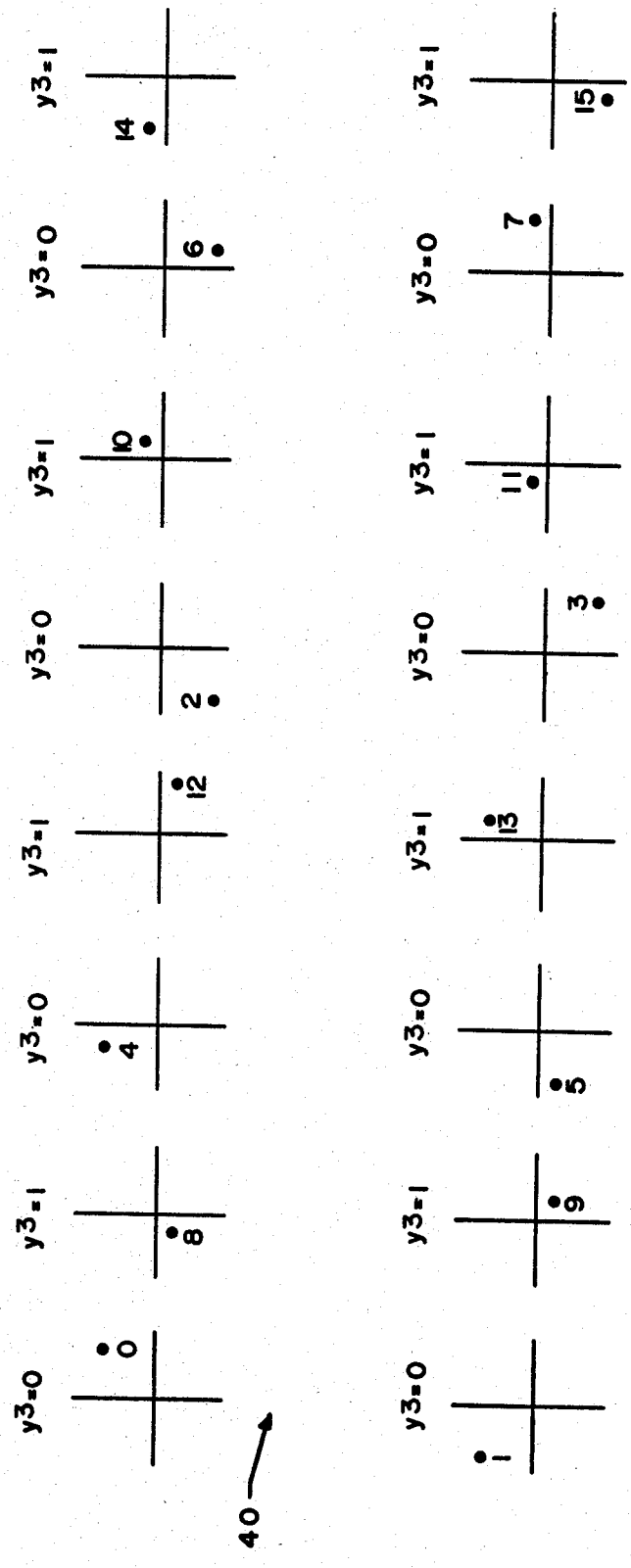
FIG_3A

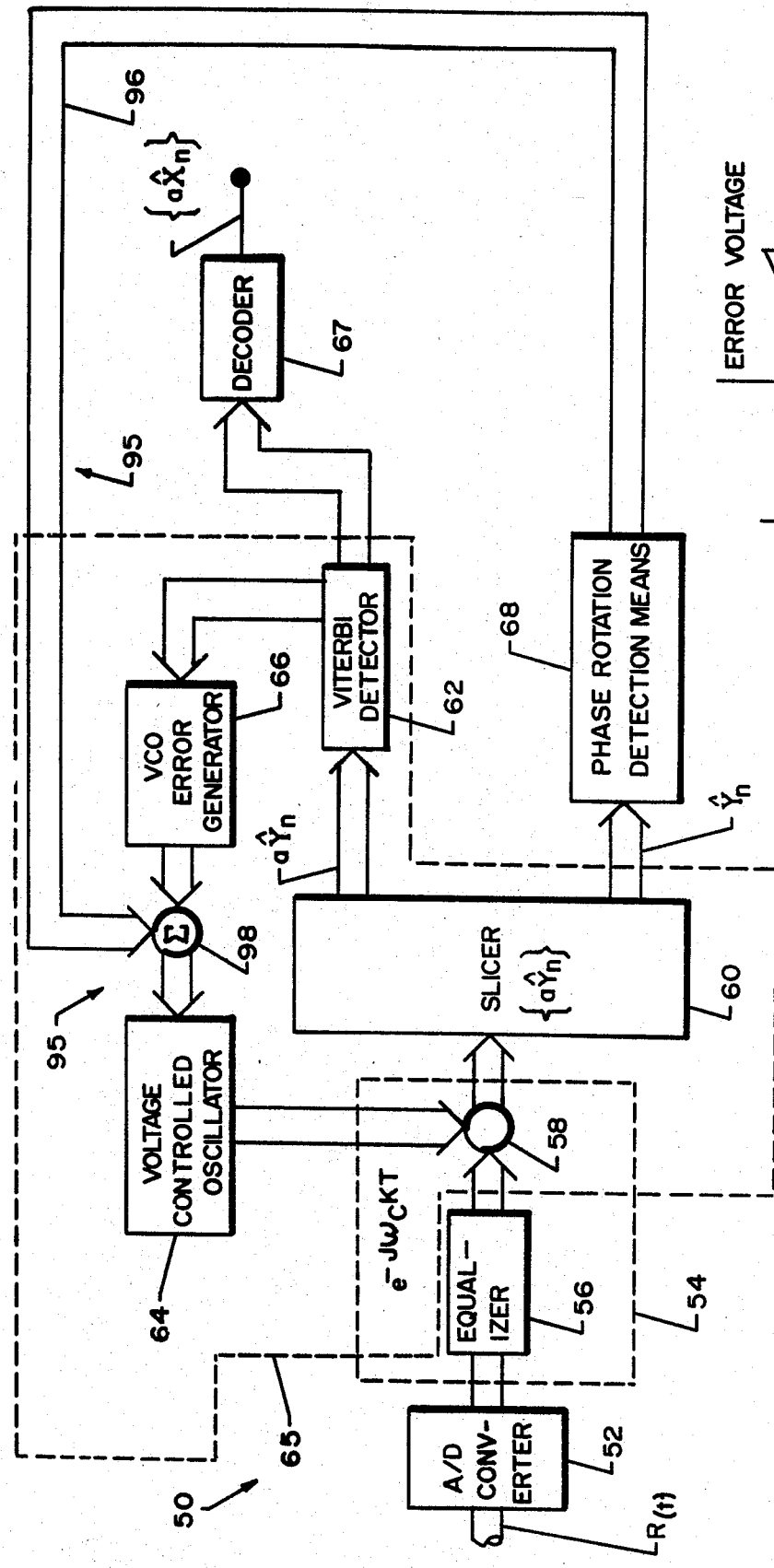
FIG._7_
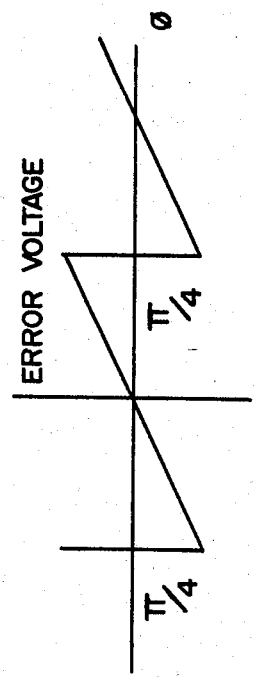
FIG._8_

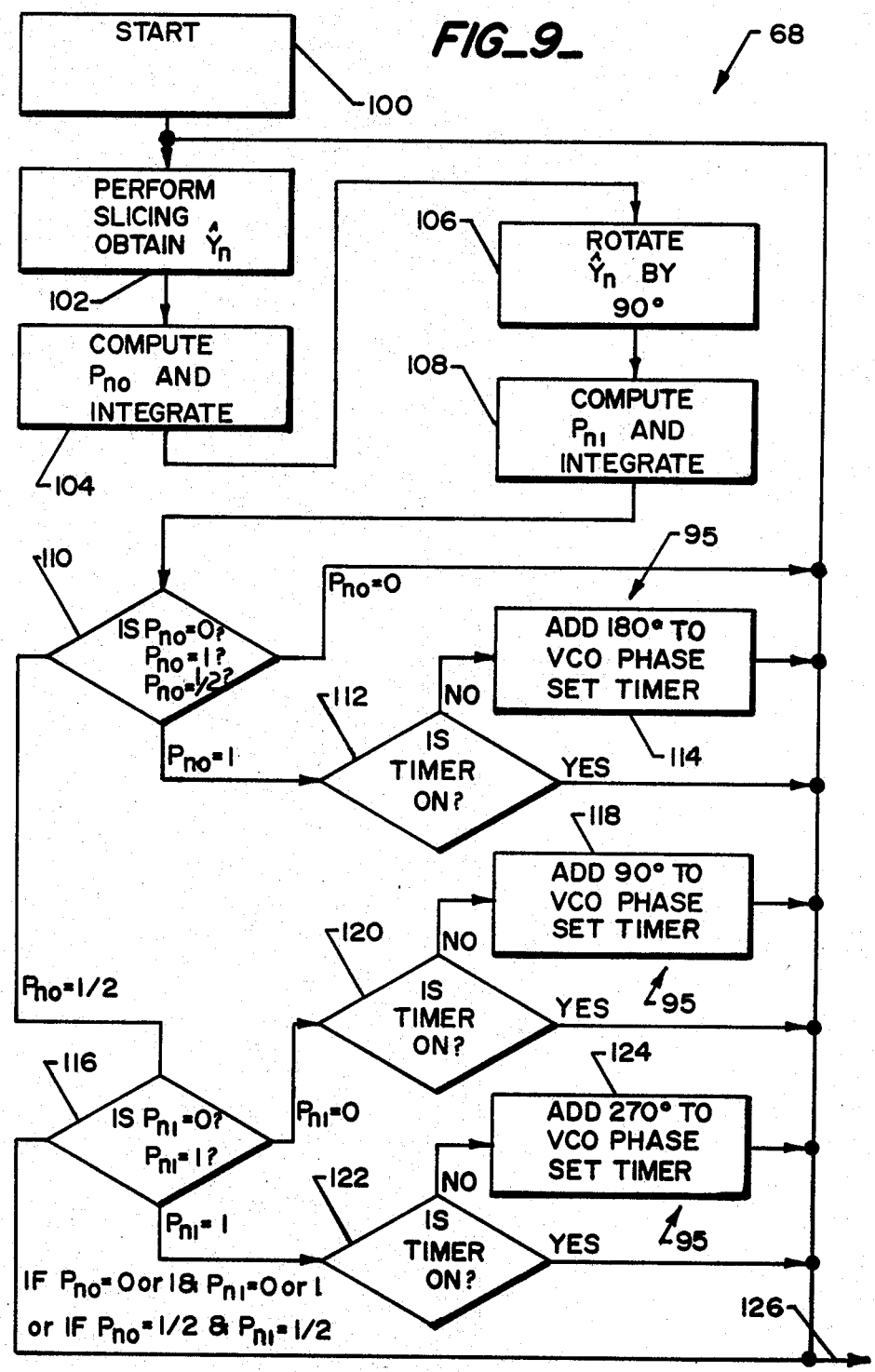

MODIFIED ABSOLUTE PHASE DETECTOR

CROSS-REFERENCES OF RELATED APPLICATIONS

This is a continuation-in-part application of application No. 548,572, filed Nov. 4, 1983.

BACKGROUND OF THE INVENTION

1. Field of the Invention

The present invention relates to a method and apparatus for adjusting carrier phase for coded two-dimensional signals received by a modem.

2. Background Art

It is known in the prior art that precoding the data at the transmitter of a modem using a convolutional encoder at the transmitter and performing maximum likelihood (Viterbi) decoding at the receiver improves the signal to noise ratio of the modem, assuming that the major impairment is Gaussian noise. As shown in U.S. Pat. No. 4,077,021 to Csajka et al., binary data is converted to multilevel complex valued symbols, with a convolutional encoder being used to precode the multilevel symbols. These multilevel symbols are represented by signal points in a signal constellation formed in the complex plane. A modulator uses the multilevel symbols to generate a modulated carrier wave signal which is transmitted over a channel to a receiver of a modem that makes a maximum likelihood decision.

In the previously mentioned U.S. Pat. No. 4,077,021, the signal points of the constellation are partitioned into multipoint subsets. This method is developed in more detail in an article entitled "Channel Coding with Multilevel/Phase Signals", G. Ungerboeck, IEEE Transactions on Information Theory, January, 1982, pp. 55–66. According to a method of mapping by set partition, the constellation is divided into subsets through a plurality of subdivisions. Each subset at a given level of subdivision is identified by a bit group output $Y_n$. The desired level of subdivision dictates the number of bits in the bit group $Y_n$, which is an output provided by the convolution encoder.

The above-described mapping by set paritition technique assumes that the phase of the received carrier signal is known. In telephone line transmission the received signal constellation may be rotated with respect to the transmitted signal constellation, due to phase hits. This rotation may cause the phase of the received signal to jump permanently to a new value. More specifically, if there is a phase hit, the received signal might be rotated by multiples of 90°. If the transmitted signal is characterized by:

$$S(t) = \Sigma a_n \cos(\omega_c t + \eta) - \Sigma b_n \sin(\omega_c t + \theta) \quad \text{(Equation A)}$$

then the received signal is given by:

$$R(t) = \Sigma a_n \cos\left(\omega_c t + \theta + \frac{K\pi}{2}\right) - \Sigma b_n \sin\left(\omega_c t + \theta + \frac{K\pi}{2}\right) \quad \text{(Equation B)}$$

where k can take any one of the values given by $k = \pm 1, \pm 2, \pm 3$, $\omega_c$ is the angular velocity of the carrier wave, and $\theta$ is the phase angle representing the encoded data. Since the phase lock-loop of the modem cannot recognize a carrier phase shift of more than 90°, the receiver will misinterpret the incoming signal. This phase hit problem is illustrated with respect to the signal constellation of FIG. 1 wherein a signal constellation of four points ($\pm 1$) is shown. If the transmitted point is (1, 1), then for a phase rotation of $\pi/2$;

$$S(t) = 1 \cdot \cos(\omega_c t + \theta) - 1 \cdot \sin(\omega_c t + \theta) \quad \text{(Equation C)}$$

and the received point is:

(Equation D)
$$R(t) = 1 \cdot \cos\left(\omega_c t + \theta + \frac{\pi}{2}\right) - 1 \cdot \sin\left(\omega_c t + \theta + \frac{\pi}{2}\right)$$

$$= -1 \cdot \sin(\omega_c t + \theta) - 1 \cdot \cos(\omega_c t + \theta) \quad \text{(Equation E)}$$

the received point will be interpreted as $(-1, 1)$, which is incorrect.

It is well-known in coding theory that a code is associated with a generator (equation) matrix and a parity equation (matrix). In the previously mentioned article by G. Ungerboeck, the parity check equation is used to analyze properties of convolutional codes and to derive systematic convolutional encoders. Mapping by set partitioning and the parity check equation are used in the implementation of the present invention, although the parity check equation is used in the present invention in a different manner for different objectives.

European patent application No. 0 052 463, teaches a method of determining whether the received signal of convolutionally encoded transmitted signal has undergone a phase rotation. To do this, the phase detector compares the decision (as to which subset was sent) made by the raw slicer after a delay of L symbols, with the decision being made by a Viterbi decoder. L is the delay that Viterbi decoder has in making a final decision to be put out to the user. If there is any difference between the two decisions, the receiver examines to see if the received point is close to the ideal point and if it is not, the receiver determines that the conflict in decisions is caused by noise. Otherwise, the receiver determines that the conflict in decisions is caused by phase rotation and this causes the error count to be incremented. When the threshold is reached, the receiver rotates the demodulated received samples by 90°. If this does not rectify the situation, then further shifts of 90° are added.

Another method of overcoming phase rotation is by differential encoding of the input bits. Ungerboeck has shown that in his method of coding one of the bits can be differentially encoded. In a CCITT submission from AT&T Informational Systems entitled "A Trellis-Coded Modulation Scheme that Includes Differential Encoding for 9600 Bit/sec, Full-Duplex, Two-wire Modem", dated August 1983, there is disclosed a method of compensating for phase rotations by multiples of 90° using differential encoding.

SUMMARY OF THE INVENTION

The present invention is directed toward an improved modulation-demodulation system and method for transmitting a plurality of information bit sequences, the system including a transmitter having a state machine means for transforming by a coding process each information bit sequence into an expanded bit sequence having at least a coded bit group portion, and the transmitter further having modulated signal generating means for modulating a carrier signal to assume one of a plurality of multilevel symbols in response to each sequentially applied expanded bit sequence, with the coded bit group portion selecting one of a plurality of subsets of the multilevel symbols, the multilevel symbols being capable of representation in a two-dimensional complex plane, and the system further including a receiver having demodulation and slicer means for obtaining the expanded bit sequences from the modulated carrier signal. The improvement comprises phase rotation detection means, coupled to the demodulation and slicer means, for uniquely identifying each adverse angular rotation; and phase correction means, coupled to the phase rotation detection means, for compensating for the adverse angular rotation. The phase rotation detection means has means for applying a parity check equation $P_n$ to a plurality of sequentially received coded bit group portions to generate a first output; means for rotating the received coded bit group portions by at least one inserted angular rotation substantially equal in magnitude to one of said adverse angular rotations not uniquely identified by the first parity check equation calculation, means for applying the parity check equation for at least a second time to the rotated coded bit group portions to provide a second output, and means, in response to said first and second outputs, for uniquely identifying the adverse angular rotations and $K \cdot 360°$ rotations.

In the receiver, both means for applying the parity check equation comprises using the following $P_n(j)$ function to compute j ($j \geq 0$) from a plurality of the sequentially received coded bit group portions or rotated coded bit group portions:

$$P_n(j) = [\hat{y}_n^r(D) \ldots \hat{y}_n^1(D), \hat{y}_n^0(D)] \cdot [H^r(D) \ldots H^1(D), H^0(D)]^T$$

where:
 $\hat{y}(D)$ represents each bit of the received and rotated coded bit group portions
 H(D) represents each term of a parity check matrix n is the symbol period
 j > 1 indicates adverse rotation
 j = 0 with 0° angular rotation
 j = 1 with 90° rotation, j = 2 with 180° rotation, and j = 3 with 270° rotation It has been found that where constellations and subset arrangements are defined so that there are double alternate compliments $P_n(1) = P_n(3)$ and $P_n(0) = P_n(2)$, the received signal constellation needs to be phase rotated only one time in the manner described above and that the parity check equation $P_n$ needs to be applied only a second time, which reduces the required computations and memory requirements of the phase detection rotation means. In this case, the combination of the first and second outputs provides a unique identifying value for each of the adverse angular rotations and for $K \cdot 360°$ angular rotations ($K \geq 0$). Thereafter, the phase correction means can correct for the detected adverse angular rotation in a number of ways.

BRIEF DESCRIPTION OF THE DRAWINGS

Further objects and advantages of the present invention will become apparent as the following description proceeds, taken in conjunction with the accompanying drawings in which:

FIG. 1 shows an illustrative four-point complex plane signal constellation.

FIG. 2 is a generalized diagram of a transmitter of a modem implementing the present invention.

FIG. 3 shows the partitioning by subset of an illustrative sixteen-point constellation using the preferred subset number assignment of the present invention. FIG. 3A shows partitioning by subset of the signal constellation of FIG. 3 at the fourth level of subdivision.

FIG. 4 shows the assignment of convolutional coder output defining subset numbers to the sixteen-point constallation illustrated in FIG. 3.

FIG. 5 is a schematic diagram of a four state convolutional encoder that can be implemented as the convolutional encoder shown in FIG. 2.

FIG. 6 is a schematic diagram of an eight state convolutional encoder that can be implemented as the convolutional encoder shown in FIG. 2.

FIG. 7 is a generalized diagram of a receiver of a modem implementing the present invention.

FIG. 8 is a graph of the phase error as a function of the voltage error.

FIG. 9 is a flow diagram of the phase rotation detection means and phase rotation correction means shown in FIG. 7.

DETAILED DESCRIPTION OF THE PREFERRED EMBODIMENTS

Referring to FIG. 2, there is shown a schematic representation of the generalized functional structure of that portion of a transmitter 10 of a modem 12 which is necessary to illustrate the implementation of present invention. A data source 14 provides a stream of digital data i.e., information bit sequences, to the modem 12 so that for every symbol period of T seconds there is an input binary sequence $aX_n$, with n being the time index of symbol period and nT being the time of occurrence of the $n^{th}$ symbol period. In the preferred embodiment, each input binary sequence $aX_n$ is divided into two bit group portions, a bit group $X_n$ consisting of bits $(x_n^1 \ldots x_n^r)$ to be coded and a bit group $uX_n$ consisting of bits $(x_n^{r+1} \ldots x_n^m)$ that is not to be coded. Coding is accomplished by a state machine 16 which preferably takes the form of a convolutional encoder. In response to the bit group $X_n$, which has r bits, the convolutional encoder generates a redundant coded bit group $Y_n$ which has $(r+1)$ bits. The convolutional encoder limits the allowed transitions between a fixed number of internal states of the convolutional encoder. A convolutional encoder with a constraint length d can be represented by a d-stage shift register with outputs of selected stages being added modulo-2 to form the encoded symbols of the coded bit group $Y_n$.

The convolutional encoder is defined as having $(2)^d$ internal states. An uncoded output bit group $uY_n$ consists of the uncoded bit group $uX_n$, which is unmodified, and an expanded bit sequence $aY_n$ is defined to include bit groups $uY_n$ and $Y_n$ and has $(m+1)$ bits. As will be seen hereinafter, in one implementation there may be no bit groups $uX_n$ and $uY_n$. The lines for each bit of the sequences $aX_n$ and $aY_n$ are not shown in FIG. 2, with dots indicating that there can be more lines for additional bits not shown, since FIG. 2 is intended to be generic to numerous possible bit sequence arrangements.

In the preferred embodiment, a modulated signal generating means 18 receives the expanded bit sequence $aY_n$. In response to the coded bit group $Y_n$, the modulated signal generating means 18 uses a state-to-signal mapper and encoder 20 to select one of $2^{r+1}$ predetermined subsets of $2^{m+1}$ complex valued multilevel symbols (the different amplitudes and phases of the carrier), which can be represented as points of the signal constellation in the complex plane. The uncoded bit group $uY_n$ is used to determine which member (designated as $A_n$) of the selected subset of complex symbols will be an output from the encoder 20. The complex symbol $A_n$ is shown being filtered by suitable bandwidth-limiting digital filters 22 to provide baseband signal shaping in accordance with conventional techniques. The filtered output signal $B_n$ is received by a suitable modulator 24 to provide a modulated output signal $C_n$.

As is well-known in the art, although the digital filters 22 are shown as baseband filters, a passband filter placed at the output of the modulator 24 could be used, or alternatively, a look-up table can be used in place of the filters 22 and the modulator 24, with the look-up table having stored therein modulated, filtered, digitized waveforms as shown in U.S. Pat. No. 3,988,540. Thereafter, the signal $C_n$ is processed by the D/A converter 26 and low-pass filter 28 to provide an analog modulated carrier signal, S(t), i.e., a channel signal (defined by Equation A), to a transmission line 30. The number of input bits in the bit group $X_n$ will depend upon the number of subsets into which the original signal constellation of the transmitter 12 is divided and the number of bits in the uncoded bit group $uX_n$, if any, will depend upon the number of points in each subset. In general, the generalized system components shown in FIG. 2 are to be found in known modem design techniques as illustrated in U.S. Pat. No. 4,077,021, which is incorporated by specific reference thereto.

As previously mentioned, the encoder 20, in response to the coded bit group $Y_n$, selects a subset of symbols. The defining of subsets and their assignment to specific coded bit groups can be, for example, accomplished by the previously described and known technique of "mapping by set partition". FIGS. 3 and 3A illustrates mapping by set partition for a sixteen-point constellation 32 shown in a complex plane representation. The constellation is divided into $2^{r+1}$ subsets, with each subset being identified in FIGS. 3 and 3A by a subset number determined by the equation:

$$Y_n = \text{Subset No.} = y^0 \cdot 2^0 + y^1 \cdot 2^1 \ldots + y^r \cdot 2^r \quad \text{(Equation 1a)}$$

Here, $Y_n$ is used to denote the bit group $(y^0 \ldots y^r)$ as well as the decimal value of the set given by Equation 1a. As will be seen hereinafter, when the subsets $Y_n$ of the original constellation are rotated by $\pm 90°$ or $180°$, they will map upon other subsets of the original constellation, such mapped-upon subsets being designated as $Z_n$. Subset number $Z_n$ is given by the following equation:

$$Z_n = z^0 \cdot 2^0 + z^1 \cdot 2^1 \ldots + z^r \cdot 2^r \quad \text{(Equation 1b)}$$

In FIG. 3 each constellation point is identified by a pair of numbers separated by a hyphen, with the first number being $Y_n$ which identifies the subset and with the second number (hereinafter referred to as point number) identifying the signal point in the constellation. There are four levels of subsets, identified by numbers 34, 36, 38 and 40, which are created by four subdivisions of the points of constellation 32. At the fourth level 40 of subsets shown in FIG. 3A, there is only one point per subset; hence, there is only a subset number associated with each signal point.

As with the prior art, during each subdivision the minimum distance between the points of the subset are increased by $\sqrt{2}$, as shown by the following equation:

$$\Delta 0 = \frac{\Delta 1}{\sqrt{2}} = \frac{\Delta 2}{2} = \frac{\Delta 3}{2\sqrt{2}} \ldots \quad \text{(Equation 2)}$$

The points of the constellation 32, which has 90° symmetry, are subdivided into subsets and the subsets are arranged relative to each other according to a methodology that creates predetermined and known relationships between the subsets of the unrotated constellation 32 and the subsets of the constellation 32 rotated by $\phi$ of 90°, 180°, and 270°. When rotation by $\phi$ is referred to, as a matter of convenience, rotation is assumed to be in counterclockwise (ccw) direction. One suitable methodology for creating the above-described predetermined and known relationships will be described in detail hereinafter with respect to FIGS. 3 and 3A. In the examples described herein, "non-rotated coordinates" and "non-rotated subsets" and "0° angular rotation" refer to multilevel symbols and subsets which have substantially K·360° rotations, where K is an integer including zero. This includes no rotation and rotations which are positive and negative multiples of 360°, but the two cannot be distinguished.

As shown in FIG. 3, the constellation 32 is first divided into two subsets 0 and 1, shown at the first level of subsets 34. The points in the subsets on the first level not only obey the distance property of Equation 2, but the points have another property, i.e., by rotating the axes by 90°; subset 0 can be mapped onto subset 1. By rotating subset 0 by 180°, subset 0 is mapped onto itself and similarly by rotating subset 0 by 180°, subset 1 is mapped onto itself. With a second subdivision, subset 0 on the first level 34 of subsets is subdivided into two subsets 0 and 2 on the second level 36 of subsets, such that the distance property of Equation 2 is satisfied. Additionally, subset 1 on the first level 34 of subsets is subdivided into two subsets 1 and 3 on the second level 36 of subsets, such that the distance property of Equation 2 is satisfied. By rotating subset 0 by 90°, subset 0 can be mapped onto subset 1 and by rotating subset 1 by 90°, subset 0 can be mapped onto subset 2 and so on as shown in TABLE 1.

TABLE 1

| NON-ROTATED SUBSET ($Y_n$) | 90° ROTATION ($Z_n$) | 180° ROTATION ($Z_n$) | 270° ROTATION ($Z_n$) |
| --- | --- | --- | --- |
| 0 | 1 | 2 | 3 |
| 1 | 2 | 3 | 0 |

TABLE 1-continued

| NON-ROTATED SUBSET ($Y_n$) | 90° ROTATION ($Z_n$) | 180° ROTATION ($Z_n$) | 270° ROTATION ($Z_n$) |
|---|---|---|---|
| 2 | 3 | 0 | 1 |
| 3 | 0 | 1 | 2 |

In TABLE 1 above, the non-rotated subsets in column one show the subsets as they are with no phase rotation, whereas columns two through four show the locations of the subsets of column one after phase rotation in terms of the unrotated numbers of the subsets of column one.

Referring to the eight subsets of the third level 38 of subsets shown in FIG. 3, the subsets have been numbered to obey the same subset mapping rule as described above and as shown in TABLE 2.

TABLE 2

| NON-ROTATED SUBSET ($Y_n$) | 90° ROTATION ($Z_n$) | 180° ROTATION ($Z_n$) | 270° ROTATION ($Z_n$) |
|---|---|---|---|
| 0 | 1 | 2 | 3 |
| 1 | 2 | 3 | 0 |
| 2 | 3 | 0 | 1 |
| 3 | 0 | 1 | 2 |
| 4 | 5 | 6 | 7 |
| 5 | 6 | 7 | 4 |
| 6 | 7 | 4 | 5 |
| 7 | 4 | 5 | 6 |

Examining the point numbers applied to each point of a subset (second number in FIG. 3), regardless of the 90°, 180°, or 270° rotation, each point number of the subset maps upon the same point number, e.g., 0—0 when rotated by 90° maps onto 1-0 and when rotated by 180° maps upon 2-0 and so on. Under this point numbering system, the points numbers (uncoded bits $uY_n$) remain invariant when the axes are rotated. For a sixteen-point constellation, the third level of subsets 38 is normally desirable; hence, leading to a convolutional encoder having a two bit $uY_n$ and a three bit $Y_n$. The fourth level 40 of subsets using the same subset mapping rule, would lead to each subset number being identified with a signal signal point, as shown in FIG. 4.

The relationship of the mapped-upon subsets $Z_n$, caused by the rotated constellation, to the subsets $Y_n$ in the original non-rotated constellation, as shown in the above tables and examples, will be described mathematically hereinafter. Assume the following:

$4(r-1) \leq Z_n \leq 4r-1; r=1,2,\ldots$ (Equation 3a)

$4r-4 \leq Y_n \leq 4r-1$ (Equation 3b)

then, $Z_n = (Y_n+1)\text{Mod}(r\cdot 4)+(r-1)\cdot 4$ for 90° (Equation 4a)

$Z_n = (Y_n+2)\text{Mod}(r\cdot 4)+(r-1)\cdot 4$ for 180° (Equation 4b)

$Z_n = (Y_n+3)\text{Mod}(r\cdot 4)+(r-1)\cdot 4$ for 270° (Equation 4c)

The above-described mapping rule merely illustrates one of many possible mapping rules that can be used in the present invention. The only requirements of the mapping rules are that (1) the subsets, when rotated in the complex plane by an adverse angular rotation, substantially, i.e., within a few degrees, map upon a unique subset other than itself for each adverse angular rotation and (2) that for each adverse angular rotation the mapped-upon subset be known so as to allow for the parity check calculations to be described hereinafter. In the above examples, the adverse angles are substantially ±90° and 180°, which are a function of having two perpendicular symmetry axes, the X-axis and the Y-axis. In the complex plane with the signal constellation having 90° symmetry with respect to these axes, the signal points of each quadrant, when rotated about the origin, can be mapped upon the signal points of any other quadrant. However, it is contemplated that variations in the number of symmetry axes can be made without departing from the spirit and scope of the invention as defined in the appended claims. For example, other signal constellations used in the prior art have had three and five symmetry axes, thereby giving 120° and 72° symmetries in the signal constellation, respectively. 120° symmetry gives adverse angular rotations of 120° and 240° and 72° symmetry gives adverse angular rotations of 72°, 144°, 216° and 288°. Hence, the term "adverse angular rotation" refers to all angular rotations that have to be removed.

By using the above-described exemplary mapping rule with the hereinafter described implementations of the present invention, adverse angular rotations can be detected with signal constellations rotated by ±90° or 180° using in part the previously mentioned parity check equation in the receiver of the modem. To derive the specific parity check equation for a given subset arrangement and a given convolutional encoder, the parity check matrix for the convolutional encoder must be calculated. Using polynomial notation, where there is no rotation, the receiver's binary output sequence Y(D), i.e., coded bit group, must satisfy the generalized parity check Equation 5:

$$P_n = [\hat{y}_n^r(D) \ldots \hat{y}_n^1(D), \hat{y}_n^0(D)] \cdot [H^r(D) \ldots H^1(D), H^0(D)]^T = 0 \quad \text{(Equation 5)}$$

where H(D) is the parity check matrix and the bits of the receiver's binary output sequence Y(D) are shown as a function of a delay operator D. The receiver sequence is differentiated from the transmitted sequence by the use of a hat on top of the variable, e.g., (Y and Ŷ). It will be seen hereinafter that the use of Equation 5 has been used in the present invention to define a function P(j), where $0 \leq j \leq 3$. When j=0, this indicates K·360° rotations where K is an integer including zero (i.e., 0°) and each non-zero value of j relates to an adverse angular rotation $\phi$. For the example described hereinafter, $j=1$ when $\phi=90°$, 2 when $\phi=180°$ and 3 when $\phi=270°$. The value of $P_n$ will depend upon the value of j and to show this dependence, $P_n$ will be written as $P_n(j)$. Additionally, i is added as a second subscript, i.e., $P_{ni}(j)$ to indicate the degree of rotation (phase shift) added by the receiver, i.e., inserted angular rotation $\beta$, according to the present invention and will be described in detail hereinafter. For the example described hereinafter, $i=0$ for $\beta=K\cdot 360°$ rotation where K is an integer including zero (i.e., 0°), $i=1$ when $\beta=90°$, $i=2$ when $\beta=180°$ and $i=3$ when $\beta=270°$.

In a first illustrative implementation of the transmitter 10 according to the present invention, the convolutional encoder 16 of FIG. 2 comprises a four-state convolutional encoder 46 shown in FIG. 5, which is used to map the sixteen-point constellation 32 into four subsets of four points each as shown on level 36 of FIG. 3. The encoder 46 has two delay operators D and one modulo-2 adder and comprises a well-known structure for coding the input bit $$x_n^1.$$

The parity check matrix H(D) for the four-state encoder 46 is given by the following equation:

$$H(D)=[H^1(D)H^0(D)]=[D,D^2+1] \quad \text{(Equation 6)}$$

The input bits in $$x_n^2 \text{ and } x_n^3$$

are the uncoded bits. The parity check Equation 5 for the convolutional encoder 40, when implemented at the modem's receiver, becomes:

$$\hat{y}_n^0 \oplus \hat{y}_{n-2}^0 \oplus \hat{y}_{n-1}^1 = 0 = P_n(0) \quad \text{(Equation 7)}$$

where the subset numbers are given by the values of $$\hat{y}_n^0 \text{ and } \hat{y}_n^1.$$

As previously mentioned, the symbols $\hat{y}$ and $\hat{z}$ to denote that these are voltages associated with the receiver.

When the Equation 7, i.e., $P_{n0}(j)$, is calculated ($i=0$), the following results are possible:

| Adverse Angular Rotation | j | $P_{n0}$ | Inserted Angular Rotation |
|---|---|---|---|
| 0° | 0 | 0 | 0° |
| 90° | 1 | $\hat{y}^0_{n-1}$(0 or 1) | 0° |
| 180° | 2 | 1 | 0° |
| 270° | 3 | $\overline{\hat{y}}^0_{n-1}$(1 or 0) | 0° |

Although adverse angular rotations of 0° and 180° are identified by $P_{n0}$ values having logic level 0 or 1, the adverse angular rotations of 90° and 270°, when averaged over a plurality of baud periods, approaches ½. After an inserted angular phase rotation of 90° ($i=1$) is introduced preferably, but not necessarily, in a direction opposite (clockwise direction) to the adverse angle rotation of the sequence Y(D), then Equation 7 yields the following:

| Adverse Angular Rotation | j | $P_{n1}$ | Inserted Angular Rotation |
|---|---|---|---|
| 0° | 0 | $\hat{y}^0_{n-1}$ | 90° |
| 90° | 1 | 0 | 90° |
| 180° | 2 | $\overline{\hat{y}}^0_{n-1}$ | 90° |
| 270° | 3 | 1 | 90° |

Now, the adverse angular rotations of 90° and 270° give $P_{n1}$ values having distinct results of 0 and 1, respectively, with the zero output being where the adverse angular rotation equals the inserted angular rotation.

When an inserted angular rotation of 180° ($i=2$) is introduced, Equation 7 provides:

| Adverse Angular Rotation | j | $P_{n2}$ | Inserted Angular Rotation |
|---|---|---|---|
| 0° | 0 | 1 | 180° |
| 90° | 1 | $\hat{y}^0_{n-1}$ | 180° |
| 180° | 2 | 0 | 180° |
| 270° | 3 | $\hat{y}^0_{n-1}$ | 180° |

No distinct outputs for $P_{n2}$ are provided for adverse angular rotations of 90° and 270°.

When an inserted angular rotation of 270° ($i=3$) is introduced, Equation 7 yields:

| Adverse Angular Rotation | j | $P_{n3}$ | Inserted Angular Rotation |
|---|---|---|---|
| 0° | 0 | $\hat{y}^0_{n-1}$ | 270° |
| 90° | 1 | 1 | 270° |
| 180° | 2 | $\overline{\hat{y}}^0_{n-1}$ | 270° |
| 270° | 3 | 0 | 270° |

Again, distinct outputs for $P_{n3}$ are achieved for 90° and 270°.

From the above $P_{ni}$ outputs, it can be seen that the $P_{ni}$ outputs revolve as an ordered sequence as the inserted angular rotations increase from 0° to 270°. As a result, an inserted angular rotation of either 90° or 270° gives distinct $P_{ni}$ outputs for adverse angular rotations of 90° and 270°. Likewise, if the inserted angular rotations are introduced in the same direction as the adverse angular rotations, then the same results are obtained except the $P_{ni}$ outputs revolve in the opposite direction, e.g., 90° inserted angular rotation in one direction is equal to 270° inserted angular rotation in the opposite direction.

In view of the above discovery, the present invention for the above example contemplates (1) calculating $P_{n0}$ using Equation 5, (2) rotating the received sequence Y(D) by either 90° or 270° using the known relationships of Equations 4a through 4c respectively, and (3) after rotation, calculating $P_{n1}$ or $P_{n3}$ by again using Equation 5, and, for the above-described example, determining the adverse angular rotation from the calculated results as follows:

If $P_{n0}=0$, then $\phi=0°$
If $P_{n0}=1$, then $\phi=180°$
If $P_{n0}=\frac{1}{2}$, $P_{n1}=0$ or $P_{n3}=1$, then $\phi=90°$
If $P_{n0}=\frac{1}{2}$, $P_{n1}=1$ or $P_{n3}=0$, then $\phi=270°$ Thereafter, the adverse angular rotation is corrected for in a matter that will be described hereinafter.

In a second implementation of the transmitter 10, the convolutional encoder 16 of FIG. 2 comprises a conventional eight-state convolutional encoder 48 shown in FIG. 6 which has three-delay elements D and two modulo-2 adders. The eight-state convolutional encoder 48 would have the following parity check matrix:

$$[H^2(D)H^1(D)H^0(D)]=[DD^2D^3\oplus 1] \qquad \text{(Equation 8)}$$

The eight-state convolutional encoder 48 is used with the sixteen-point constellation 32 of FIG. 3 to generate four subsets of level 36 when there is no phase rotation, the parity check Equation 5 becomes:

$$P_{n0}(0) = \hat{y}^2_{n-1} \oplus \hat{y}^1_{n-2} \oplus \hat{y}_n^0 \oplus \hat{y}^0_{n-3} = 0 \qquad \text{(Equation 9)}$$

$P_{n0}(1) = \hat{y}^0_{n-2}$
$P_{n0}(2) = 1$
$P_{n0}(3)\hat{y}^0_{n-2}$

As with the example of FIG. 5, $P_{n0}(1)$ and $P_{n0}(3)$ would have an average value of ½ and $P_{n0}(2)$ an average value of 1. Again, the adverse angles of 90° and 270° can be distinguished by introducing a inserted angular rotation of 90° or 270°.

Although specific cases of convolutional encoders have been illustrated and have been associated with various exemplary signal constellations, these are merely exemplary of many possible encoder and subset combinations in which can exist in modems incorporating the present invention. While there are many other examples, some of the more common examples would be to use this technique with 64, 128 and 256 point signal constellation. For instance, it is well-known that an eight-state encoder with 16 point subsets gives good minimum distance results with a 128 point signal constellation in a 14,400 bits per second modem.

Referring to Equation 5, for the examples described so far, the conditions the parity check has to satisfy in order for $P_n(1)=\overline{P_n}(3)$ and $P_n(0)=\overline{P_n}(2)$ (where "—" indicates compliment) are: (1) the term $H^1(D)$ of the parity check matrix $H^r(D) \ldots H^1(D)H^0(D)$ has an odd number of terms, and (2) the term $H^0(D)$ of the parity check matrix has an even number of terms. These conditions are not overly restrictive because it has been shown in the previously mentioned Ungerboeck article that if:

$$[H^r(D) \ldots H^t(D) \ldots H^s(D) \ldots H^0(D)]$$

Where $0 \leq s < t \leq r$ has the desired coding gain, but does not satisfy the conditions (1) and (2), then a transformation can be applied so that restrictions (1) and (2) are satisfied. Under this transformation the new parity check matrix becomes:

$$[H^r(D) \ldots H^t(D) \ldots H^t(D)+H^s(D) \ldots H^0(D)]$$

As is known in the art, this transformation preserves the coding gain and can be applied repeatedly. With signal constellations not having the above-described pair of complements, it is contemplated that more than one rotation and two $P_n$ calculations may be required.

Although all the techniques described here have been illustrated using nonsystematic encoders, it will be clear to those skilled in the art that these techniques are equally applicable for systematic encoders.

Generalizing above, for those adverse angular rotations for which the application of the first $P_n$ calculation does not give a unique identifying value so as to ascertain the same, there must be the introduction in the receiver of a inserted angular rotation of the same magnitude as either of the unidentified adverse angular rotations, but in either direction. Thereafter, the second $P_n$ calculation can be made. For example, in the above examples, the unidentified adverse angular rotations are 90°+K·360° and 270°+K·360°; consequently, the inserted angular rotation must have one of those two values.

It will be obvious to those skilled in the art that the parity check Equation 5 can be modified to provide unique identifying values at 90° and 270°, but not at 0° and 180°. For example, this would be true of Equation 7, when $$P_n \oplus \hat{y}^0_{n-1},$$

and of Equation 9, when $$P_n \oplus \hat{y}^0_{n-2}.$$

Likewise, although providing no added advantage, a known angular rotation could be introduced prior to the first calculation, i.e., $P_{n0}$. These variations will be considered as defining a new $P_{n0}$ calculations for the purposes of the claims and are intended to be covered when the term $P_{n0}$ as used therein.

A portion of a receiver 50 of the modem 12 necessary to illustrate the invention is shown in FIG. 7. The received signal R(t) is sampled by a sampler and A/D converter 52, equalized and demodulated by an equalizer and demodulator means 54 in one of many different ways known in the art, some of which are shown in U.S. Pat. No. 3,878,468 to Falconer et al., and U.S. Pat. No. 4,028,626 to Motley et al., both of which are incorporated by specific reference thereto. Although a passband equalizer 56 is shown, i.e., a demodulator 58 after equalizer 56, the present invention is equally applicable to a receiver having a baseband equalizer, i.e., demodulation before equalization. The equalized and demodulated signal, representing a two-dimensional, complex valued signal, is fed to a conventional slicer 60 which has as an output the uncoded bits and the coded bits and as previously described the coded bits represent the subset number of the most likely subset. The slicer 60 is of the conventional type and can be realized using comparators. The slicer 60 is followed by a Viterbi detector 62 of conventional type such as illustrated in the previously incorporated U.S. Pat. No. 4,077,021 and the articles "Viterbi Decoding for Satellite and Space Communications," by J. A. Heller et al., published in IEEE Trans. Comm. Tech., Vol. COM-19(1971), and "The Viterbi Algorithm" by G. D. Forney, published in Proc. IEEE, Vol. 61(1973). A voltage controlled oscillator (VCO) 64 is used for deriving the local carrier and the phase of the local carrier can be tracked in conjunction with the equalizer 56 using known techniques such as shown in the previously mentioned U.S. Pat. Nos. 3,878,468 and 4,028,626. To explain the implementation of our invention in the receiver, a brief description will be given of the well-known phase lock-loop (PLL) technique used in the receiver and illustrated in FIG. 7. A carrier PLL 65 includes the slicer 60, the detector 62, the VCO 64, the multiplier 58, and a VCO error generator 66 which includes a low-pass filter. This loop has a characteristic which repeats itself every $\pi/2$ as shown in FIG. 8, which is a plot of the error voltage against the phase error. Whenever there is a phase hit of 90° or multiple of 90° and the resulting line signal is shifted in phase by a multiple of 90°, then the receiver PLL cannot distinguish between $\theta$ and $\theta+90°$. As mentioned earlier, this causes the received signal to be decoded incorrectly. The Viterbi detector 62 and the subsequent decoder 68 provide an estimate of the transmitted sequence $aX_n$. The structure of the receiver described so far with respect to FIG. 7 is well-known in the art and is per se not part of the invention. In the preferred embodiment the above-described receiver circuits, after the sampler and A/D converter 52, are implemented by a microprocessor. Accordingly, all of these circuits are those typically already available in conventional digital data, microprocessor-based modems. As will be appreciated by those in the art, the microprocessor-based modem control and data processing circuits (not shown) also typically include the usual data storage elements (e.g. ROM for program control storage and the like, and RAM for variable input/output/intermediate result data, etc.) conventionally associated with a microprocessor CPU for performing desired manipulation of digital signals in accordance with a stored program. In the presently preferred exemplary embodiment, these already present microprocessor CPU, ROM and RAM elements are also utilized to perform the hereinafter described elements of the invention. However, such functions could be performed in a hard-wired implementation.

In accordance with the present invention, the amount of phase shift comprising adverse angular rotations is calculated using the $P_{ni}$ functions and the phase of the carrier is adjusted accordingly. In FIG. 7 phase rotation detector means 68 is generally shown and includes the means for calculating $P_{n0}$, rotating the sequence $Y_n$, calculating $P_{n1}$ or $P_{n3}$, and determining the adverse angular rotation from these calculations. Phase correction means 95, using the phase correction signal, can apply the phase correction in many different ways. In one way shown in FIG. 7, this phase correction can be applied the phase lock-loop 65 via line 96 to a summer 98 so that the PLL carrier phase estimation (preferred) is adjusted. Alternatively, the phase correction can be added to the subset number used by the decoder 62 which decodes the bit output sequence from the slicer 60. This phase correction information can also be used to correct the past subset numbers.

For the two previously described examples, the preferred exemplary embodiment achieves the implementation of the rotation detector means 68 and the phase correction means 95 by including an additional small program segment or subroutine in the microprocessor circuits. A simplified exemplary flow diagram for one possible program segment is shown in FIG. 9. After the usual start or program entry at 100, the slicing routine at step 102 determines the closest ideal point to the received point to give the received coded bit group $\hat{Y}_n$. The parity check routine implementing Equation 5 computes the value of $P_{n0}$ polynomial at step 104 and the results are time averaged (integrated) to eliminate noise spikes from influencing the results at step 110. At step 106, the received coded bit group $\hat{Y}_n$ (subset numbers) is rotated by an inserted angular rotation of 90° by using a look-up table to implement Equation 4c to obtain the new subset number $\hat{Z}_n$ (must be in binary form). This defines a rotated coded bit group portion $\hat{Z}_n$. At step 108, the parity check routine implementing Equation 5 computes the value of the $P_{n1}$ polynomial ($\hat{Z}_n$ becomes the new $\hat{Y}_n$ in Equation 5) and again the results are averaged. In the first previously described example, as can be seen from Equation 7, bit portions of the last three received coded bit groups $\hat{Y}_n$ and of the last three calculated rotated coded bit groups $\hat{Z}_n$ must be extracted from memory to make the two above-described parity check calculations. Likewise, as shown by Equation 9, in the second previously described example, bit portions from the last four values of $\hat{Y}_n$ and $\hat{Z}_n$ are needed for the parity check calculations. At step 110, if $P_{n0}=0$ no phase adjustment is needed and the program branches back to step 102. If $P_{n0}=1$, then the program branches to step 112 and if the timer at step 112 is not on (which inhibits correction), then the program proceeds to step 114 where the VCO phase is increased by 180°. The timer is then turned on so that further correction is inhibited for a period of approximately 30 bauds, i.e., symbol periods T. At step 110, if the value of $P_n$ is between 0 and 1, e.g., ½, the program proceeds to step 116 and if $P_{n1}=0$, then the phase of the VCO is increased by 90° at step 118, assuming that timer is not in the inhibitive mode at step 120. Similarly, for $P_n=1$ at step 116, the program branches to step 122 and the phase of the VCO is increased by 270° at step 124, assuming the timer is not in the inhibitive mode at step 122. At each of the steps 114, 118, 124, instead of immediately correcting for the adverse angular rotation, the timer is turned on to inhibit correction for a predetermined number of symbol intervals. Consequently, at steps 110 and 116, the average values of $P_{n0}$ and $P_{n1}$ will be calculated over this period of time and a decision will not be made until the timer goes off. If the noise is excessive so that the operation of this circuit is not proper than (optionally) the circuit can send alarm via line 126. Depending upon the expected output error rate, the $P_n$ calculations can typically be averaged over the last 16 to 64 symbol intervals.

In the two previously described examples, the parity check matrix was chosen and the subsets were defined so that (a) $P_n(1)=\overline{P_n(3)}$ and $P_n(0)=\overline{P_n(2)}$ (defining double alternate compliment pairs) and (b) the averaged values $P_n(0)$ and $P(2)$ gives 1's and 0's when $P_n(1)$ and $P_n(3)$ average approximately ½ or vice versa. These constraints lead to the least required calculations, i.e., two parity check $P_n$ calculations and one coded bit group rotation using an inserted angular rotation which is equal in magnitude to one of the adverse angular rotations not having a $P_n$ calculation that gives a unique output. It is contemplated that the techniques of the present invention can be extended to parity check matrixes, if any, not meeting these requirements that may or may not require additional $P_n$ calculations and coded bit group rotations.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

We claim:

1. In a modulation-demodulation system including a transmitter having a convolutional encoder for transforming each of a plurality of information bit sequences into a plurality of expanded bit sequences with each of said expanded bit sequences having at least a coded bit group portion and a modulated signal generating means, in response to each of said expanded bit sequences, for selecting from a plurality of complex-valued symbols at least one said symbol to define a subset and for generating a modulated carrier signal by modulating a carrier signal to assume one of said symbols from said subset, said system further including a receiver having demodulation and slicer means for demodulating and detecting said modulated carrier signal to obtain a plurality of received expanded bit sequences having at least a plurality of received coded bit group portions; the improvement comprising:

phase rotation detection means, coupled to said demodulation and slicer means, for uniquely identifying each of a plurality of adverse angular rotations and $K \cdot 360°$ rotation, where K is an integer including zero;

said phase rotation detection means including means for applying a parity check equation $P_n$ a first time to said received coded bit group portions to generate a first output;

said phase rotation detection means further including means for rotating said received coded bit group portions by at least one inserted angular rotation substantially equal in magnitude to one of said adverse angular rotations not uniquely identified by said first output to provide rotated coded bit portions;

said phase rotation detection means including means for applying said parity check equation $P_n$ at least a second time to said rotated coded bit portions to provide a second output;

said phase rotation detector means further including means, in response to said first and second outputs, for uniquely identifying said adverse angular rotations and said $K \cdot 360°$ rotations; and phase corrections means, coupled to said phase rotation detection means, for compensating for said plurality of adverse angular rotations in said receiver.

2. The modulation-demodulation system according to claim 2, wherein said adverse angular rotations are substantially $\pm 90°$ and $180°$.

3. The modulation-demodulation system of claim 2, wherein each said means for applying said parity check equation $P_n$ comprises implementing said parity check equation $P_n$ in the following form:

$$P_n(j) = [\hat{y}_n^r(D) \ldots \hat{y}_n^1(D), \hat{y}_n^0(D)] \cdot [H_n^r(D) \ldots H_n^1(D), H_n^0(D)]^T$$

and where y(D) represents each bit of r bits of said received and rotated coded bit group portions, H(D) represents each term of r terms of a parity check matrix, n is the symbol period, $j=0$ for $0°$ rotation, $j=1$ for $90°$ rotation, $j=2$ for $180°$ rotation, and $j=3$ for $270°$ rotation; and wherein said phase rotation detection means further includes means for determining a unique identifying value for a given said adverse angular rotation from said first and second outputs of said means for applying said parity check equation $P_n(j)$.

4. The modulation-demodulation system of claim 3, wherein said means for rotating said received coded bit portions by at least one inserted angular rotation comprises means for rotating said received coded bit group by only one said inserted angular rotation and said means for applying said parity check equation $P_n$ at least a second time comprises means for applying said parity check equation only a second time.

5. The modulation-demodulation system of claim 4, wherein said outputs of said parity check equation $P_n$ have a compliment relationship of $P_n(0) = \overline{P_n}(2)$ and $P_n(1) = \overline{P_n}(3)$.

6. The modulation-demodulation system of claim 4, wherein each of said expanded bit sequences includes an uncoded bit group portion having at least one bit and each said subset includes a plurality of said complex-valued symbols, said modulated carrier generating means further including means for using said uncoded bit group portion of selecting said one complex-valued symbol for modulating said carrier signal from said one of a plurality of subsets selected by said coded bit group portion.

7. The modulation-demodulation system of claim 4, wherein each of said expanded bit sequences includes only said coded bit group portion and each said subset includes a single said complex-valued symbol.

8. The modulation-demodulation system of claims 3 through 5, wherein both said first and second outputs provide a discrete binary value for each of a plurality of symbol periods, each said symbol period corresponding to a time interval during which one of said multilevel symbols is transmitted, and wherein said means for uniquely identifying includes means for determining, at the end of said plurality of symbol periods, one of said angular rotations from said discrete binary values.

9. The modulation-demodulation system of claim 8, wherein said means for uniquely identifying further includes means for computing for each of said first and second outputs an average value of said discrete binary values over said plurality of symbol periods, said average value which has a magnitude at the end of said plurality of symbol periods which approaches or is equal to a discrete binary value comprises said unique identifying value for one of said plurality of angular rotations.

10. In a modulation-demodulation method for transmitting a plurality of information bit sequences including the steps of transforming a coding process the information bit sequences into a plurality of expanded bit sequences with each of the expanded bit sequences having at least a coded bit group portion, subdividing a signal constellation of multilevel symbols into a plurality of subsets with each subset having at least one multilevel symbol, selecting one of the plurality of subsets in response to the coded bit group portion, modulating a carrier signal by one multilevel symbol from the selected subset to generate a modulated carrier signal, and demodulating and detecting the modulated carrier signal to obtain a plurality of received expanded bit sequences having at least a plurality of received coded bit group portions, wherein the improvement comprises:

uniquely identifying each of a plurality of adverse angular rotations and $0°$ angular rotation;

said step of uniquely identifying including applying a parity check equation $P_n$ a first time, calculated by using the received coded bit group portions, to generate a first output;

said step of uniquely identifying further including rotating the received coded bit group portions by at least one inserted angular rotation substantially equal in magnitude to one of the adverse angular rotations not uniquely identified by the first output to provide rotated coded bit group portions;

said step of uniquely identifying further includes applying the parity check equation $P_n$ at least a second time, calculated by using the rotated coded bit group portions, to provide a second output; and said step of uniquely identifying further includes uniquely identifying the adverse angular rotations and 0° rotations from the first and second outputs.

11. The modulation-demodulation method of claim 10, wherein each said step of applying said parity check equation includes applying said parity check equation in the following form:

$$P_n(j) = [\hat{y}_n^r(D) \ldots \hat{y}_n^1(D), \hat{y}_n^0(D)] \cdot [H_n^r(D) \ldots H_n^1(D), H_n^0(D)]^T$$

and where y(D) represents each bit of r bits of the received and rotated coded bit group portion, H(D) represents each term of r terms of a parity check matrix, n is the symbol period, j=0 for 0° rotation, j=1 for 90° rotation, j=2 for 180° rotation, and j=3 for 270° rotation; and determining a unique identifying value for a given adverse angular rotation from the first and second outputs.

12. The modulation-demodulation method of claim 11, wherein said step of rotating said received coded bit group portions by at least one inserted angular rotation comprises rotating said received coded bit group portions by only one said inserted angular rotation and said step of applying the parity check equation $P_n$ at least a second time comprises applying the parity check equation only a second time.

13. The modulation-demodulation method of claim 12, wherein the outputs of the parity check equation $P_n$ have a compliment relationship of $P_n(0)=P_n(2)$ and $P_n(1)=P_n(3)$.

14. The modulation-demodulation method of claim 12, wherein said step of subdividing the signal constellation includes providing the subsets with a plurality of the multilevel symbols, said step of expanding the information bit sequences includes providing each of the expanded bit sequences with an uncoded bit group portion, said step of modulating a carrier signal including selecting one of the multilevel symbols for modulation from the selected subset in response to the uncoded bit group portion.

15. The modulation-demodulation method of claim 12, wherein said step of subdividing the signal constellation includes each subset with only one point.

16. The modulation-demodulation method of claims 11 through 13, wherein both the first and second outputs provide a discrete binary value for each of a plurality of symbol periods, each said symbol period corresponding to a time interval during which one of said multilevel symbols is transmitted, and wherein said step of uniquely identifying further includes determining at the end of said plurality of symbol periods one of said angular rotations from said discrete binary values.

17. The modulation-demodulation method of claim 16, wherein said step of uniquely identifying further includes computing an average value of the discrete binary values over the plurality of symbol periods for each of said first and second outputs, the average value which has a magnitude at the end of the plurality of symbol periods which approaches or is equal to a discrete binary value comprises the unique identifying value for one of said angular rotations.

* * * * *